United States Patent [19]

Bornmann et al.

[11] 4,013,879
[45] Mar. 22, 1977

[54] DIGITAL MULTIPLIER

[75] Inventors: Robert Edward Bornmann, Clifton, N.J.; John Richard Cowan, Brooklyn, N.Y.; Mark Joel Schneider, Nutley, N.J.

[73] Assignee: International Telephone and Telegraph Corporation, Nutley, N.J.

[22] Filed: June 2, 1975

[21] Appl. No.: 582,945

[52] U.S. Cl. .............................................. 235/164
[51] Int. Cl.² ........................................ G06F 7/52
[58] Field of Search ................................... 235/164

[56] References Cited

UNITED STATES PATENTS

| | | | |
|---|---|---|---|
| 3,610,907 | 10/1971 | Taylor | 235/164 |
| 3,617,723 | 11/1971 | Melvin | 235/164 |
| 3,805,043 | 4/1974 | Clary | 235/164 |
| 3,816,732 | 6/1974 | Jackson | 235/164 X |
| 3,885,141 | 5/1975 | Kieburtz | 235/164 |

Primary Examiner—Jerry Smith
Attorney, Agent, or Firm—John T. O'Halloran; Alfred C. Hill

[57] ABSTRACT

The digital CMOS/LSI synchronous serial multiplier includes a register to store an X-bit sign magnitude multiplier in parallel. The digital multiplier number can be entered into the register either serially or in parallel. A serial N-bit 2's complement multiplicand input is provided. (X − 1) adder stages are connected in series. A control arrangement coupled to the register, the multiplicand input and the adder stages are provided to couple each of the magnitude bits of the multiplier number into a different one of the adder stages with the adder stages performing successive additions of the magnitude bits of the multiplier number to provide as an output of a last of the adder stages a serial product having M bits. A serial Y-bit 2's complement addend can be coupled to the first of the adder stages to add the addend to the product.

42 Claims, 5 Drawing Figures

| Signal | Label | |
|---|---|---|
| MULTIPLIER REGISTER CLOCK | A | |
| MULTIPLIER SERIAL INPUT DATA | B | W1 W2 W3 W4 W5 W6 W7 W8 WS |
| MULTIPLIER REGISTER OUTPUT | C | W1 W2 W3 W4 W5 W6 W7 W8 WS |
| PRODUCT CLOCK | D | |
| RESET | E | |
| CLEAR | F | |
| SIGN HOLD | G | |
| MULTIPLICAND | H | M1 M2 M3 M4 M5 M6 M7 M8 MS |
| AUXILIARY MULTIPLICAND OUTPUT | I | M1 M2 M3 M4 M5 M6 M7 M8 MS |
| PRODUCT A | J | P1 P2 P3 P4 P5 P6 P7 P8 P9 P10 P11 P12 P13 P14 P15 P16 PS |
| ADDEND INPUT | K | A1 A2 A3 A4 A5 A6 A7 A8 AS |

Fig. 2C

| FIG. 2A | FIG. 2B |
|---|---|

DIGITAL MULTIPLIER

BACKGROUND OF THE INVENTION

This invention relates to multipliers and more particularly to digital multipliers.

Digital multipliers are known in the prior art which employ PMOS (P Channel Metal Oxide Semiconductor) technology, and requires multiple high voltage power supplies and two phase clocking. The dynamic logic used results in a minimum operating clock rate.

SUMMARY OF THE INVENTION

An object of the present invention is to provide a digital CMOS/LSI (Complementary Metal Oxide Semiconductor Large Scale Integrated) synchronous serial multiplier.

Another object of the present invention is the provision of a digital synchronous serial multiplier that uses static logic and, therefore, has no minimum operating clock rate.

Still another object of the present invention is to provide a digital synchronous serial multiplier that can operate from a single power supply.

A further object of the present invention is the provision of a digital synchronous serial multiplier employing CMOS technology thereby making the multiplier compatible with off-the-shelf CMOS logic families, such as RCA's 4000 Series.

A feature of the present invention is to provide a digital CMOS/LSI synchronous serial multiplier comprising: first means to store a X-bit sign magnitude multiplier number in parallel, where X is an integer greater than one; a first input for a serial N-bit 2's complement multiplicand, where N is an integer greater than one; second means including (X − 1) adder stages connected in series; and third means coupled to the first means, the first input and the second means to couple each of the magnitude bits of the multiplier number into a different one of the adder stages, the adder stages performing successive additions of the magnitude bits of the multiplier number to provide as an output of a last of the adder stages a serial product having M bits, where M is an integer greater than one.

Another feature of the present invention is to provide a second input for the above described multiplier for a serial Y-bit 2's complement addend coupled to the first of the adder stages to enable adding the addend to the product.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
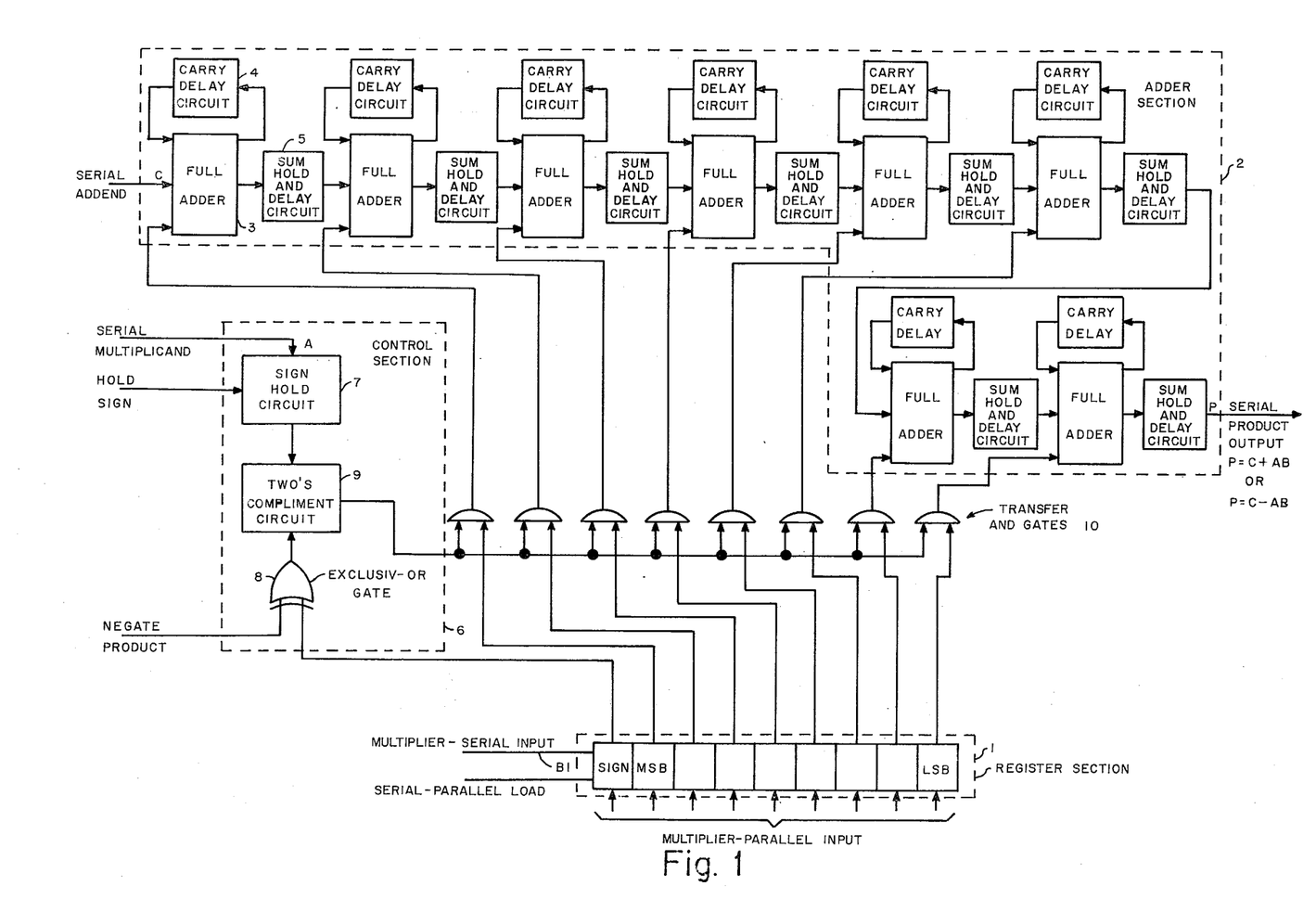
FIG. 1 is a block diagram of the digital CMOS/LSI synchronous serial multiplier in accordance with the principles of the present invention.

Referring to FIG. 1, the multiplier of this invention is divided into four sections, namely, a register section 1 into which an X-bit sign magnitude multiplier number may be entered serially or in parallel. As illustrated the multiplier signal has one sign bit and eight magnitude bits with the most significant bit (MSB) being stored in the register stage next to the sign bit stage and the least significant bit (LSB) being stored in the last register stage of register section 1. The second section of the multiplier of this invention includes the adder section 2, each stage of which includes a full adder 3, a carry delay circuit 4 coupled between the carry output and carry input of full adder 3 and a sum hold and delay circuit 5 coupled to the sum output of the full adder and to one of the inputs of the full adder of the succeeding stage. The serial addend input in 2's complement representation is coupled to one input of the full adder 3 of the first stage of the adder section 2 so that the addend can be added to the product formed in adder section 3. The next section is a control section 6 which includes a sign hold circuit 7 which receives the multiplicand in serial form and 2's complement representation and a hold sign signal. A negate product input and the output of the sign bit stage of register section 1 are coupled to an EXCLUSIVE-OR gate 8. A 2's complement circuit 9 is coupled to the output of circuit 7 and gate 8 to provide control signals for the fourth section of the multiplier, namely, the transfer AND gates 10. As seen in FIG. 1, each stage of register section 1 is coupled through an associated one of gates 10 to the other input of a different one of the plurality of stages of adder section 2.

The digital CMOS/LSI synchronous serial multiplier of FIG. 1 can multiply an X-bit sign magnitude number (the multiplier number) by an N-bit 2's complement number (the multiplicand). In the example illustrated in the drawings, X is equal to 9 and N can be equal to any length. The multiplication operation is done serially, that is, after the multiplier number has been entered into register section 1, the first bit of the product is available at the output of the last stage of adder section 2 after (N + 2) bit periods and the complete product after (N + 11) bit periods for an N-bit multiplicand. As mentioned, a 2's complement number (the addend) can be added to the product. The multiplying circuit is also cascadeable to increase the size of the multiplier word. It can be increased in steps of four, seven or eight bits which will be discussed hereinbelow with reference to FIGS. 2A and 2B.

Figure 2A:
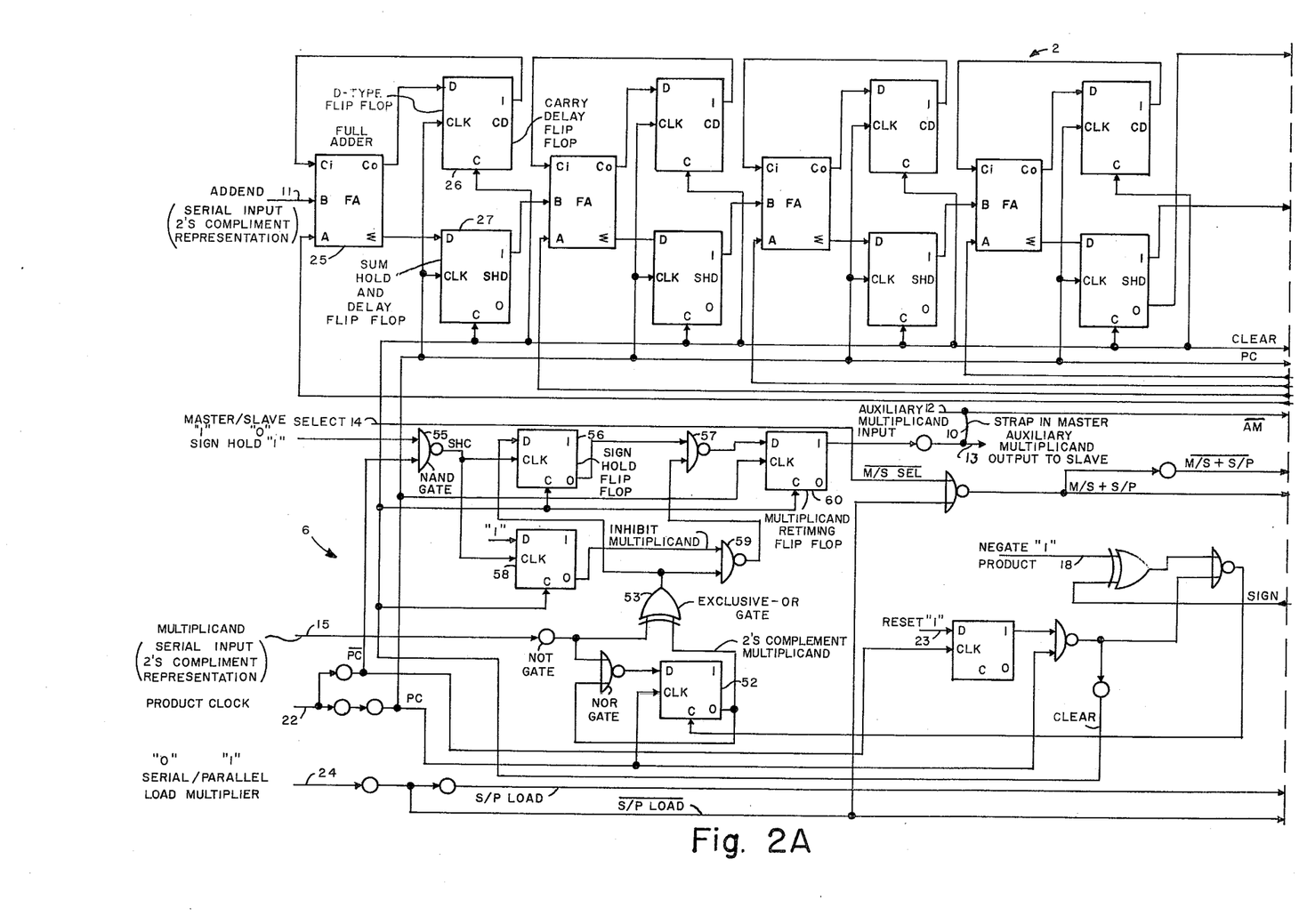
FIGS. 2A and 2B when oriented as shown in FIG. 2C is a logic diagram of the digital CMOS/LSI synchronous serial multiplier in accordance with the principles of the present invention.
Figure 2B:
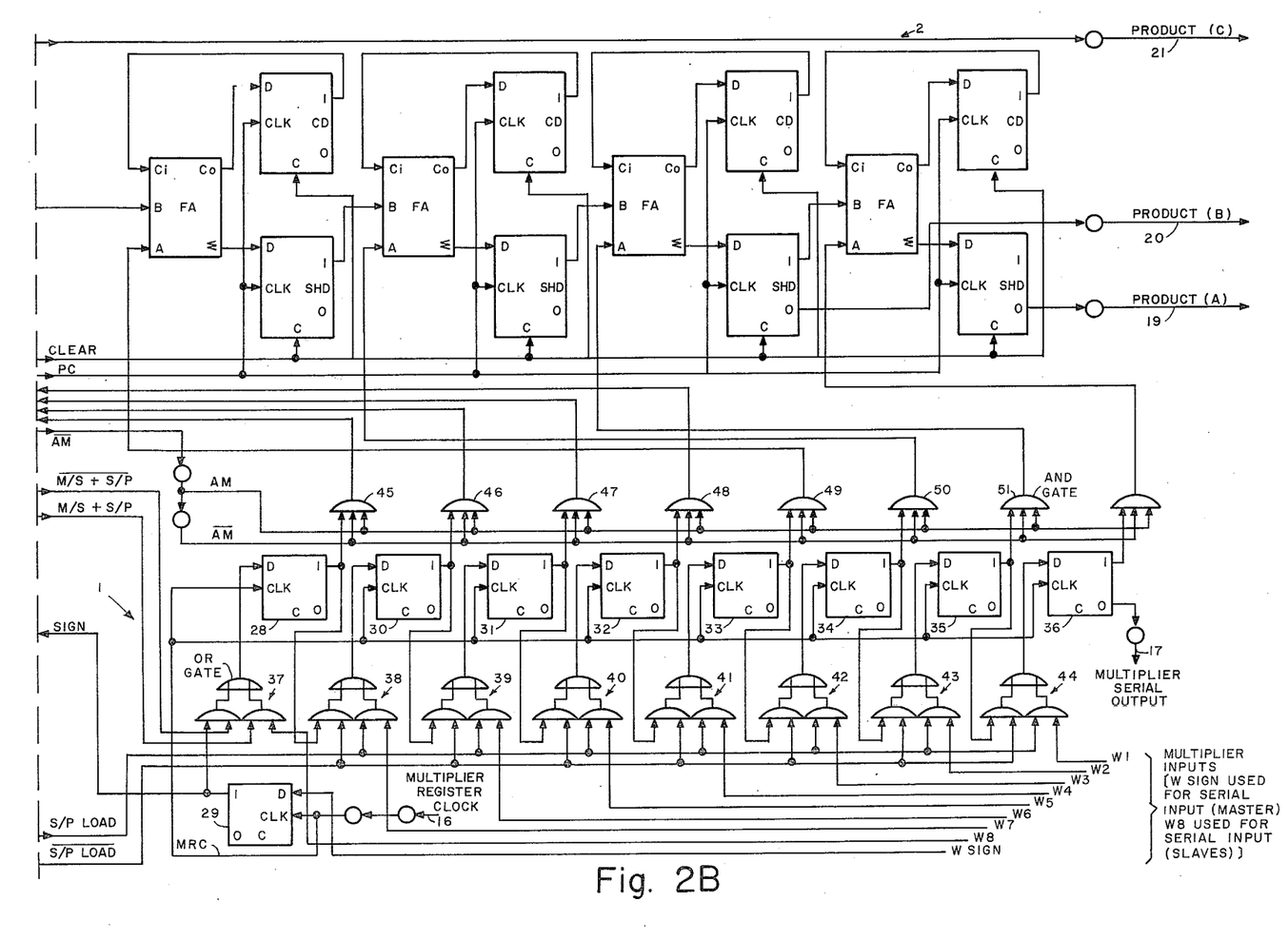
Figures 2C, 3:
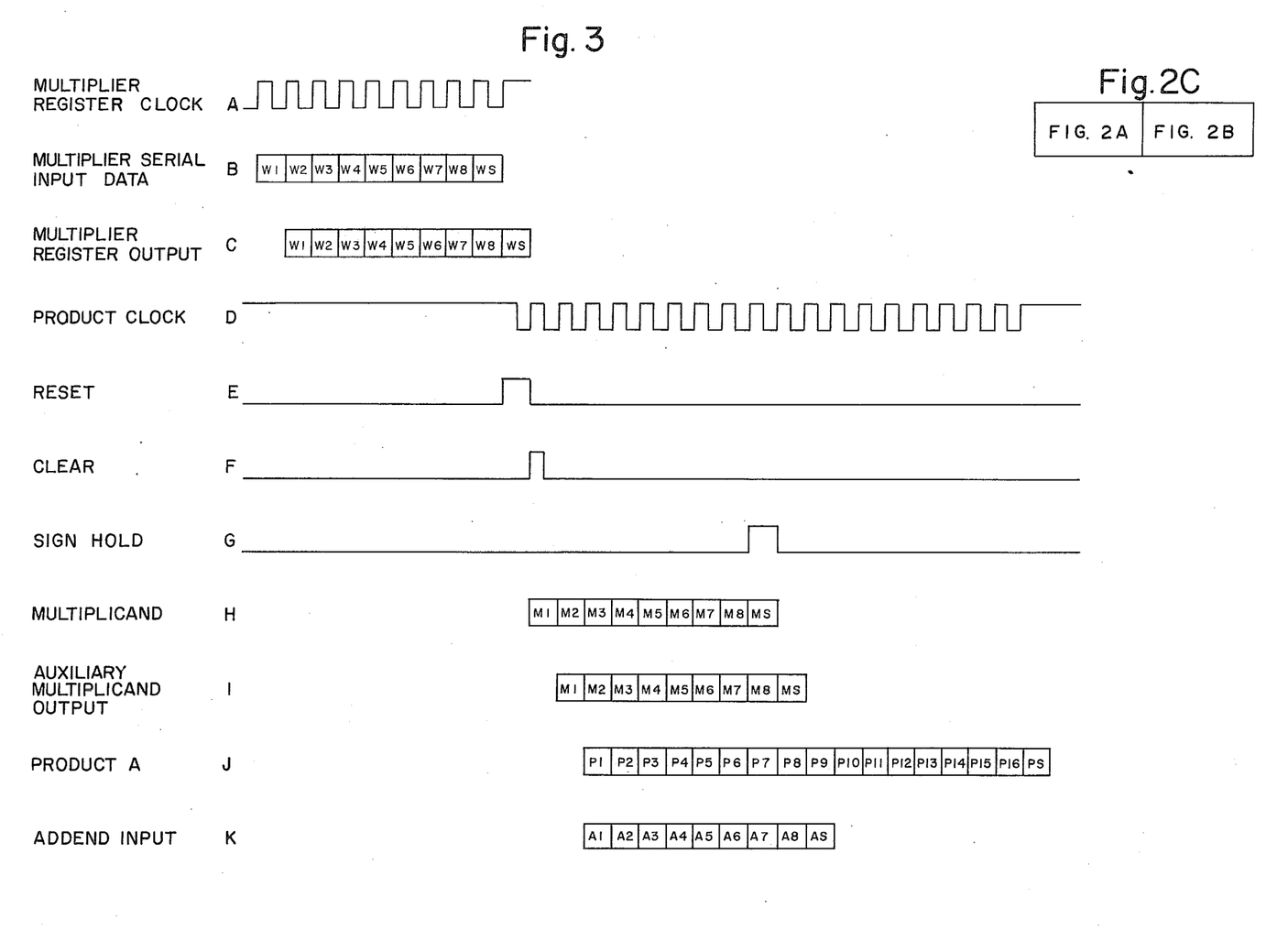
FIG. 3 is a timing diagram useful in explaining the operation of the logic diagram of FIGS. 2A and 2B.

Referring to FIGS. 2A and 2B when oriented as illustrated in FIG. 2C, the logic diagram of the synchronous serial multiplier of FIG. 1 is illustrated. The bottom portion of the sheet containing FIG. 2B illustrates the logic components of register section 1, while the top portion of FIGS. 2A and 2B illustrates the logic components of adder section 2. The bottom portion of the sheet containing FIG. 2A illustrates the logic components of the control section 6 of FIG. 1.

One of each of the different logic symbols has been labeled with an identifying legend in FIGS. 2A and 2B and these labeled logic symbols are employed as a logic symbol table to identify the identical symbols employed throughout the logic diagram.

Let us now consider the situation where the multiplier of FIGS. 2A and 2B are cascadeable. In such a cascadeable arrangement there would be a master multiplier and a given number of slave multipliers driven by the master multiplier. The multiplier illustrated in FIGS. 2A and 2B is a master multiplier, however, the same logic components are in a slave multiplier with strap 10 between the auxiliary multiplicand input and the auxiliary multiplicand output being removed.

Let us consider the various input and output connections to the logic diagram. The addend input 11 supplies serially a 2's complement number that is serially added to the product. Input 11 is connected to logical "0" when not used. The auxiliary multiplicand input 12 provides a conditioned multiplicand input that must be connected to the auxiliary multiplicand output 13 of the master. As illustrated, output 13 is strapped to input 12 by strap 10 in the master multiplier. The auxiliary multiplicand output 13 provides a conditioned multiplicand output that can drive itself (a master multiplier plus four slave multipliers. Output 13 is left open on the slave multipliers. The master/slave select input 14 is set to a logical 1 in the master multiplier and a logical "0" in each slave multiplier. The multiplicand input 15 provides an N-bit 2's complement multiplicand which is entered serially at this input. The multiplier number inputs $W_1 - W_8$ and $W_{sign}$ are connected to register section 1 with the multiplier number being either a five, eight or nine bit sign magnitude number. Numbers other than these sizes may be used, but they must be made to look like a five, eight, or nine bit number by setting least significant bits equal to zero; timing must be provided. $W_8$ is the most significant bit of the magnitude and $W_1$ is the least significant bit of the magnitude. The multiplier number can be entered into register section 1 serially or in parallel. In the serial mode the multiplier number is entered serially on the input $W_{sign}$ in the master multiplier and entered in serially on the input $W_8$ in the slave multiplier. In the parallel mode the most significant bit stages of register section 1 must be used if less than eight bits of magnitude are used. Any unused inputs must be connected to logical 0.

Input 16 provides the multiplier register clock which is synchronous with the multiplier number to enter the multiplier number into register section 1. Data is entered into register section 1 on the positive going edge of the clock. Output 17 is a multiplier number serial ouput. If a slave multiplier is used, the multiplier number serial output 17 must be connected to the multiplier number input $W_8$ of the slave multiplier to extend the length of the multiplier number register for serial operation. The negate product input 18 provides a logical 1 which 2's complement the product. Otherwise, the negate product input must be a logical 0. Product (A) output 19 provides a serial product output in 2's complement notation when an eight bit magnitude multiplier number is employed. The product (B) 20 provides a serial product output in 2's complement notation when a seven bit magnitude multiplier number is employed. Product (C) output 21 provides a serial product output in 2's complement notation when a four bit magnitude multiplier is employed. It is these product outputs 19–21 that enable cascading the multiplier illustrated to increase the size of the multiplier word in steps of four, seven or eight magnitude bits as mentioned hereinabove. The product clock input 22 provides a clock which is synchronous with the multiplicand and is used to enter the multiplicand and form the product. Data is entered on the positive going edge of the product clock pulse. One product clock pulse must precede the multiplicand and there must be (N + M + 2) clock pulses, where N is the number of bits of the multiplicand and M is the number of bits of magnitude of the product. Reset input 23 provides a logical 1 pulse that clears internal storage flip flops. The reset pulse at input 23 must overlap the positive edge of the first product clock period only. The serial/parallel load input 24 selects the mode in which the multiplier number is entered into register section 1. A logical 0 is used for serial entry and a logical 1 is used for parallel entry.

The multiplier of this invention can operate at a product clock rate of 1700 kilohertz maximum at a power supply differential of 10 volts with no minimum operating frequency. The temperature range in which the serial multiplier of this invention operates is from 55° C to 125° C at the maximum operating rate.

Each stage of the adder section 2 includes full adder 25, a carry delay flip flop 26 of the D-type having its D input coupled to the carry output Co of adder 25 and its 1 output coupled to the carry input Ci of adder 25. The sum output of adder 25 is coupled to the D input of the sum hold and delay flip flop 27 of the D-type with the 1 output being coupled to the B input of the full adder of the succeeding stage. The A input of the full adders are coupled to an associated one of the multiplier number magnitude flip flops 28, and 30–36 of register section 1 through transfer AND gates 45–51 which are controlled by the auxiliary multiplicand input AM and the inverse of the auxiliary multiplicand input $\overline{AM}$.

The multiplication cycle can be divided into two portions, loading of the multiplier number in register section 1 and performing the multiplication. Referring to the timing diagram of FIG. 3 along with the logic diagram of FIGS. 2A and 2B, the operation will be explained for a nine by N bit multiplication.

In the serial mode, the multiplier register clock (Curve A, FIG. 3) at terminal 16 sequentially loads the multiplier number (Curve B, FIG. 3) into D-type flip flops 28–36. The AND/OR gating logic 37–44 under control of the serial/parallel load signal at input 24 connects the flip flops 28–36 into a nine bit shift register. After nine multiplier number register clock pulses, the multiplier number is loaded into register section 1. In the parallel mode, the AND/OR gating logic 37–44 provides direct access to each of their associated ones of flip flops 28 and 30–36. Only one multiplier number register clock pulse is required.

The multiplication is performed by successive additions of the multiplier at the output of register section 1 (Curve C, FIG. 3) in the stages of adder section 2 when the multiplicand bit is a logical 1 so as to pass the associated magnitude bits through transfer AND gates 45–51. The multiplier number is always considered as a positive number. If it is negative, the multiplicand (Curve H, FIG. 3) is 2's complemented by D-type flip flop 52 and EXCLUSIVE-OR gate 53 to give the correct sign to the product. The multiplicand is also 2's complemented by flip flop 52 and gate 53 when the negate input 18 is a logical 1, thereby changing the sign of the product. The negate input 18 must be a logical 1 during the entire multiplication process. In order to prevent adding a correction factor when multiplying in a 2's complement notation, the sign of the multiplicand must be extended the length of the multiplier. This is accomplished by the sign hold input which is logical 1, NAND gate 55, D-type sign hold flip flop 56, NAND gate 57, D-type flip flop 58 and NAND gate 59 when connected as illustrated.

The timing diagram of FIG. 3 shows the multiplication process for a nine bit multiplicand and a nine bit multiplier number resulting in a seventeen bit product. Curve A, FIG. 3, shows the multiplier register clock applied at terminal 16, Curve B, FIG. 3, shows the multiplier serial input data stored in flip flops 28–36 and Curve C, FIG. 3 shows the multiplier register output from transfer AND gates 45–51. The first product pulse of Curve D, FIG. 3, and the reset signal at terminal 23 shown in Curve E, FIG. 3, generates an internal clear signal, Curve F, FIG. 3, that resets all flip flops. The second product clock pulse of Curve D, FIG. 3, enters the first bit of the multiplicand (Curve H, FIG. 3) into the multiplicand retiming flip flop 60. If this first bit is a logical 1 the multiplier number is added to the previous partial product, which is a logical 0 in this case since the flip flops were reset. If the previous partial product is a logical 0, all logical 0's are added. The third clock pulse of Curve D, FIG. 3, enters the sum into the sum hold flip flop 27 and the first bit of the product is available. This continues until the sign bit of the multiplicand of Curve I, FIG. 3 (the output of flip flop 60), shows up, identified by the sign hold pulse of Curve G, FIG. 3. At this time, the multiplicand is inhibited in NAND gate 59 and its sign is stored in sign hold flip flop 56. Eight more clock pulses, the length or number of the multiplier number magnitude bits, are required to complete the multiplication. During this period, either the multiplier number is always added to the partial products or all logical 0's are added and the contents of the sample hold flip flops 27 are simply shifted out one at a time. Due to the clearing operation and the retiming of the multiplicand, multiplication requires two more product clock pulses than the number of product bits. The resultant product A is shown in Curve J, FIG. 3, and the addend input is shown in Curve K, FIG. 3.

The digital CMOS/LSI synchronous serial multiplier of this invention may be employed in any digital processing circuitry where multiplication is required, such as in digital filters and digital correlators.

While we have described above the principles of our invention in connection with specific apparatus it is to be clearly understood that this description is made only by way of example and not as a limitation to the scope of our invention as set forth in the objects thereof and in the accompanying claims.

We claim:

1. A digital CMOS/LSI synchronous serial multiplier comprising:
    first means to store a X-bit sign magnitude multiplier number in parallel, where X is an integer greater than one;
    a first input for a serial N-bit 2's complement multiplicand, where N is an integer greater than one;
    second means including (X − 1) adder stages connected in series;
    third means coupled to said first means, said first input and said second means to couple each of the magnitude bits of said multiplier number into a different one of said adder stages, said adder stages performing successive additions of the magnitude bits of said multiplier to provide as an output of a last of said adder stages a serial product having M bits, where M is an integer greater than one; and
    a second input for a serial Y-bit 2's complement addend coupled to a first of said adder stages to add said addend to said product;
    said first means including
        a sign bit flip flop,
        (X − 1) magnitude bit flip flops, and
        (X − 1) gate circuit coupled to said sign bit flip flop and said magnitude flip flops in a predetermined manner to provide a X-bit register; and
    each of said gate circuits including
        two AND gates, each of said AND gates being under control of a different control signal, one of said AND gates being coupled to an output of an immediately preceeding one of said flip flops and the other of said AND gates being coupled to an associated bit of said multiplier number, and
        an OR gate having two inputs each coupled to the output of a different one of said two AND gates and an output coupled to a next succeeding one of said flip flops.

2. A multiplier according to claim 1, wherein said gate circuits can load said multiplier number in said register in parallel.

3. A multiplier according to claim 1, wherein said gate circuits can load said multiplier number in said register serially.

4. A multiplier according to claim 1, wherein said sign bit flip flop and said magnitude bit flip flops are each D-type flip flops.

5. A multiplier according to claim 1, wherein each of said adder stages includes
    a full adder,
    a carry delay flip flop coupled between a carry out and a carrying input of said full adder, and
    a sum hold and delay flip flop coupled to a sum output of said full adder, the 1 output of said sum hold and delay flip flop providing an input signal to the next succeeding one of said adder stages.

6. A multiplier according to claim 5, wherein each of said carry delay and said sum hold and delay flip flops are under control of a product clock.

7. A multiplier according to claim 6, wherein each of said carry delay and said sum hold and delay flip flops are D-type flip flops.

8. A digital CMOS/LSI synchronous serial multiplier comprising:
    first means to store a X-bit sign magnitude multiplier number in parallel, where X is an integer greater than one;
    a first input for a serial N-bit 2's complement multiplicand, where N is an integer greater than one;
    second means including (X − 1) adder stages connected in series;
    third means coupled to said first means, said first input and said second means to couple each of the magnitude bits of said multiplier number into a different one of said adder stages, said adder stages performing successive additions of the magnitude bits of said multiplier to provide as an output of a last of said adder stages a serial product having M bits, where M is an integer greater than one; and
    a second input for a serial Y-bit 2's complement addend coupled to a first of said adder stages to add said addend to said product;
    said third means including
        a third input for a hold sign signal,
        a fourth input for a negate product signal, a sign hold circuit coupled to said first input and said third input, a first EXCLUSIVE-OR gate coupled to said fourth input and the sign bit of said multiplier number, a two's complement circuit coupled to said first EXCLUSIVE-OR gate and said sign hold circuit, and (X − 1) three input AND gates, each having its output coupled to a different one of said adder stages, a first of said inputs being coupled to the output of said two's complement circuit responsive to said multiplicand, a second of said inputs being coupled to the output of said two's complement circuit responsive to an inverted version of said multiplicand and the third of said inputs being coupled to a different one of the magnitude bits of said multiplier number.

9. A multiplier according to claim 8, wherein said sign hold circuit includes
a first flip flop coupled to said third input,
a second flip flop coupled to said third input,
an INHIBIT gate coupled to said second flip flop,
a third flip flop coupled to said first and second flip flops, and
a second EXCLUSIVE-OR gate having one input coupled to said first input and its output coupled to said INHIBIT gate.

10. A multiplier according to claim 9, wherein said two's complement circuit includes
a fourth flip flop having its 0 output coupled to the other input of said second EXCLUSIVE-OR gate and its clear input coupled to the output of said first EXCLUSIVE-OR gate, and
a two input gate circuit having one input coupled to said first input, its other input coupled to the 0 output of said fourth flip flop and its output coupled to the 1 input of said fourth flip flop.

11. A multiplier according to claim 10, wherein said first, second, third and fourth flip flops are each D-type flip flops.

12. A digital CMOS/LSI synchronous serial multiplier comprising:
first means to store a X-bit sign magnitude multiplier number in parallel, where X is an integer greater than one;
a first input for a serial N-bit two's complement multiplicand, where N is an integer greater than one;
second means including (X − 1) adder stages connected in series;
third means coupled to said first means, said first input and said second means to couple each of the magnitude bits of said multiplier number into a different one of said adder stages, said adder stages performing successive additions of the magnitude bits of said multiplier to provide as an output of a last of said adder stages a serial product having M bits, where M is an integer greater than one; and
a second input for a serial Y-bit two's complement addend coupled to a first of said adder stages to add said addend to said product;
said first means including
a sign bit flip flop,
(X − 1) magnitude bit flip flops, and
(X − 1) gate circuits coupled to said sign bit flip flop and said magnitude bit flip flops in a predetermined manner to provide a X-bit register;
each of said adder stages including
a full adder, a carry delay flip flop coupled between a carry output and a carry input of said full adder, and
a sum hold and delay flip flop coupled to a sum output of said full adder, the 1 output of said sum hold and delay flip flop providing an input signal to the next succeeding one of said adder stages; and
said third means including
a third input for a hold sign signal,
a fourth input for a negate product signal,
a sign hold circuit coupled to said first input and said third input,
a first EXCLUSIVE-OR gate coupled to said fourth input and said sign bit flip flop,
a two's complement circuit coupled to said first EXCLUSIVE-OR gate and said sign hold circuit, and
(X − 1) three input AND gates, each having its output coupled to a different one of said adder stages, a first of said inputs being coupled to the output of said two's complement circuit responsive to said multiplicand, a second of said inputs being coupled to said two's complement circuit responsive to an inverted version of said multiplicand and the third of said inputs being coupled to a different one of said magnitude bit flip flops.

13. A multiplier according to claim 12, wherein said gate circuits can load said multiplier number in said register in parallel.

14. A multiplier according to claim 12, wherein said gate circuits can load said multiplier number in said register serially.

15. A multiplier according to claim 12, wherein said sign bit flip flop and said magnitude bit flip flops are each D-type flip flops.

16. A multiplier according to claim 12, wherein each of said gate circuits includes
two AND gates, each of said AND gates being under control of a different control signal, one of said AND gates being coupled to an output of an immediately preceeding one of said flip flops and the other of said AND gates being coupled to an associated bit of said multiplier number, and
an OR gate having two inputs each coupled to the output of a different one of said two AND gates and an output coupled to a next succeeding one of said flip flops.

17. A multiplier according to claim 12, wherein each of said carry delay and said sum hold and delay flip flops are under control of a product clock.

18. A multiplier according to claim 12, wherein each of said carry delay and said sum hold and delay flip flops are D-type flip flops.

19. A multiplier according to claim 12, wherein said sign hold circuit includes
a first flip flop coupled to said third input,
a second flip flop coupled to said third input,
an INHIBIT gate coupled to said second flip flop,
a third flip flop coupled to said first and second flip flop, and
a second EXCLUSIVE-OR gate having one input coupled to said first input and its output coupled to said INHIBIT gate.

20. A multiplier according to claim 19, wherein said two's complement circuit includes
a fourth flip flop having its 0 output coupled to the other input of said second EXCLUSIVE-OR gate and its clear input coupled to the output of said first EXCLUSIVE-OR gate, and a two input gate circuit having one input coupled to said first input, its other input coupled to the 0 output of said fourth flip flop and its output coupled to the 1 input of said fourth flip flop.

21. A multiplier according to claim 20, wherein said first, second, third and fourth flip flops are each D-type flip flops.

22. A digital CMOS/LSI synchronous serial multiplier comprising:
   first means to store a X-bit sign magnitude multiplier number in parallel, where X is an integer greater than one;
   a first input for a serial N-bit 2's complement multiplicand, where N is an integer greater than one;
   second means including (X − 1) adder stages connected in series; and
   third means coupled to said first means, said first input and said second means to couple each of the magnitude bits of said multiplier number into a different one of said adder stages, said adder stages performing successive additions of the magnitude bits of said multiplier to provide an an output of a last of said adder stages a serial product having M bits, where M is an integer greater than one;
   said first means including
      a sign bit flip flop,
      (X − 1) magnitude flip flops, and
      (X − 1) gate circuits coupled to said bit flip flop and said magnitude flip flops in a predetermined manner to provide a X-bit register; and
   each of said gate circuits including
      two AND gates, each of said AND gates being under control of a different control signal, one of said AND gates being coupled to an output of an immediately preceeding one of said flip flops and the other of said AND gates being coupled to an associated bit of said multiplier number, and
      an OR gate having two inputs each coupled to the output of a different one of said two AND gates and an output coupled to a next succeeding one of said flip flops.

23. A multiplier according to claim 22, wherein said gate circuits can load said multiplier number in said register in parallel.

24. A multiplier according to claim 22, wherein said gate circuits can load said multiplier number in said register serially.

25. A multiplier according to claim 22, wherein said sign bit flip flop and said magnitude bit flip flops are each D-type flip flops.

26. A multiplier according to claim 22, wherein each of said adder stages includes
   a full adder,
   a carry delay flip flop coupled between a carry out and a carrying input of said full adder, and
   a sum hold and delay flip flop coupled to a sum output of said full adder, the 1 output of said sum hold and delay flip flop providing an input signal to the next succeeding one of said adder stages.

27. A multiplier according to claim 26, wherein each of said carry delay and said sum hold and delay flip flops are under control of a product clock.

28. A multiplier according to claim 26, wherein each of said carry delay and said sum hold and delay flip flops are D-type flip flops.

29. A digital CMOS/LSI synchronous serial multiplier comprising:
   first means to store a X-bit sign magnitude multiplier number in parallel, where X is an integer greater than one;
   a first input for a serial N-bit 2's complement multiplicand, where N is an integer greater than one;
   second means including (X − 1) adder stages connected in series; and
   third means coupled to said first means, said first input and said second means to couple each of the magnitude bits of said multiplier number into a different one of said adder stages, said adder stages performing successive additions of the magnitude bits of said multiplier to provide as an output of a last of said adder stages a serial product having M bits, where M is an integer greater than one;
   said third means including
      a third input for a hold sign signal,
      a fourth input for a negate product signal,
      a sign hold circuit coupled to said first input and said third input,
      a first EXCLUSIVE-OR gate coupled to said fourth input and the sign bit of said multiplier number,
      a two's complement circuit coupled to said first EXCLUSIVE-OR gate and said sign hold circuit, and
      (X − 1) three input AND gates, each having its output coupled to a different one of said adder stages, a first of said inputs being coupled to the output of said two's complement circuit responsive to said multiplicand, a second of said inputs being coupled to the output of said two's complement circuit responsive to an inverted version of said multiplicand and the third of said inputs being coupled to a different one of the magnitude bits of said multiplier number.

30. A multiplier according to claim 29, wherein said sign hold circuit includes
   a first flip flop coupled to said third input,
   a second flip flop coupled to said third input,
   an INHIBIT gate coupled to said second flip flop,
   a third flip flop coupled to said first and second flip flops, and
   a second EXCLUSIVE-OR gate having one input coupled to said first input and its output coupled to said INHIBIT gate.

31. A multiplier according to claim 30, wherein said two's complement circuit includes
   a fourth flip flop having its 0 output coupled to the other input of said second EXCLUSIVE-OR gate and its clear input coupled to the output of said first EXCLUSIVE-OR gate, and
   a two input gate circuit having one input coupled to said first input, its other input coupled to the 0 output of said fourth flip flop and its output coupled to the 1 input of said fourth flip flop.

32. A multiplier according to claim 31, wherein said first, second, third and fourth flip flops are each D-type flip flops.

33. A digital CMOS/LSI synchronous serial multiplier comprising:
   first means to store a X-bit sign magnitude multiplier number in parallel, where X is an integer greater than one;
   a first input for a serial N-bit two's complement multiplicand, where N is an integer greater than one;
   second means including (X − 1) adder stages connected in series; and third means coupled to said first means, said first input and said second means to couple each of the magnitude bits of said multiplier number into a different one of said adder stages, said adder stages performing successive additions of the magnitude bits of said multiplier to provide as an output of a last of said adder stages a serial product having M bits, where M is an integer greater than one;

said first means including
- a sign bit flip flop,
- (X − 1) magnitude bit flip flops, and
- (X − 1) gate circuits coupled to said sign bit flip flop and said magnitude bit flip flops in a predetermined manner to provide a X-bit register;

each of said adder stages including
- a full adder,
- a carry delay flip flop coupled between a carry output and a carry input of said full adder, and
- a sum hold and delay flip flop coupled to a sum output of said full adder, the 1 output of said sum hold and delay flip flop providing an input signal to the next succeeding one of said adder stages; and said third means including
- a third input for a hold sign signal,
- a fourth input for a negate product signal,
- a sign hold circuit coupled to said first input and said third input,
- a first EXCLUSIVE-OR gate coupled to said fourth input and said sign bit flip flop,
- a two's complement circuit coupled to said first EXCLUSIVE-OR gate and said sign hold circuit, and
- (X − 1) three input AND gates, each having its output coupled to a different one of said adder stages, a first of said inputs being coupled to the output of said two's complement circuit responsive to said multiplicand, a second of said inputs being coupled to said two's complement circuit responsive to an inverted version of said multiplicand and the third of said inputs being coupled to a different one of said magnitude bit flip flops.

34. A multiplier according to claim 33, wherein said gate circuits can load said multiplier number in said register in parallel.

35. A multiplier according to claim 33, wherein said gate cicuits can load said multiplier number in said register serially.

36. A multiplier according to claim 33, wherein said sign bit flip flop and said magnitude bit flip flops are each D-type flip flops.

37. A multiplier according to claim 33, wherein each of said gate circuit includes
- two AND gates, each of said AND gates being under control of a different control signal, one of said AND gates being coupled to an output of an immediately preceeding one of said flip flops and the other of said AND gates being coupled to an associated bit of said multiplier number, and
- an OR gate having two inputs each coupled to the output of a different one of said two AND gates and an output coupled to a next succeeding one of said flip flops.

38. A multiplier according to claim 33, wherein each of said carry delay and said sum hold and delay flip flops are under control of a product clock.

39. A multiplier according to claim 33, wherein each of said carry delay and said sum hold and delay flip flops are D-type flip flops.

40. A multiplier according to claim 33, wherein said sign hold circuit includes
- a first flip flop coupled to said third input,
- a second flip flop coupled to said third input,
- an INHIBIT gate coupled to said second flip flop,
- a third flip flop coupled to said first and second flip flops, and
- a second EXCLUSIVE-OR gate having one input coupled to said first input and its output coupled to said INHIBIT gate.

41. A multiplier according to claim 40, wherein said two's complement circuit includes
- a fourth flip flop having its 0 output coupled to the other input of said second EXCLUSIVE-OR gate and its clear input coupled to the output of said first EXCLUSIVE-OR gate, and
- a two input gate circuit having one input coupled to said first input, its other input coupled to the 0 output of said fourth flip flop and its output coupled to the 1 input of said fourth flip flop.

42. A multiplier according to claim 41, wherein said first, second, third and fourth flip flops are each D-type flip flops.

* * * * *